US010926723B2

(12) United States Patent
Chierichetti et al.

(10) Patent No.: US 10,926,723 B2
(45) Date of Patent: Feb. 23, 2021

(54) SYSTEM AND METHOD FOR POST-ACCIDENT VEHICLE SENSOR TESTING

(71) Applicant: Intel Corporation, Santa Clara, CA (US)

(72) Inventors: Rebecca Chierichetti, Brookings, OR (US); Andrea Johnson, Beaverton, OR (US); Glen J. Anderson, Beaverton, OR (US); Omar Ulises Florez Choque, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 15/870,015

(22) Filed: Jan. 12, 2018

(65) Prior Publication Data

US 2019/0047493 A1 Feb. 14, 2019

(51) Int. Cl.
*B60R 16/023* (2006.01)
*G01D 18/00* (2006.01)
*G01P 15/08* (2006.01)
*G07C 5/00* (2006.01)
*B60R 21/0136* (2006.01)
*B60R 21/00* (2006.01)
*B60R 21/013* (2006.01)
(Continued)

(52) U.S. Cl.
CPC ...... *B60R 16/0234* (2013.01); *B60R 21/0136* (2013.01); *G01D 18/00* (2013.01); *G01P 15/0802* (2013.01); *G01P 21/00* (2013.01); *G07C 5/008* (2013.01); *G07C 5/0808* (2013.01); *B60R 2021/0027* (2013.01); *B60R 2021/01302* (2013.01); *G05D 1/0088* (2013.01)

(58) Field of Classification Search
CPC ............ B60R 16/0234; B60R 21/0136; G01D 18/00; G01P 15/0802
See application file for complete search history.

(56) References Cited

U.S. PATENT DOCUMENTS

| 2005/0192727 | A1* | 9/2005 | Shostak | .......... B60C 11/24 |
| | | | | 701/37 |
| 2016/0288799 | A1* | 10/2016 | Nguyen Van | ......... G01S 13/87 |
| 2019/0043278 | A1* | 2/2019 | Stefan | .......... G06F 16/2379 |

OTHER PUBLICATIONS

Clevert, Djork-Arne, et al., "Fast and Accurate Deep Network Learning by Exponential Linear Units (ELUS)", ICLR. arXiv preprintarXiv:1511.07289., (2016), 14 pgs.
(Continued)

*Primary Examiner* — Michael D Lang
(74) *Attorney, Agent, or Firm* — Schwegman Lundberg & Woessner, P.A.

(57) ABSTRACT

A system and method performed by a sensor testing apparatus of a vehicle are provided for determining when certain event conditions are true. The event conditions comprise detecting an occurrence of a predefined event that impacts a sensor of the vehicle. After the predefined event is detected, a test is performed to determine whether the sensor is outputting sensor values within sensor specification values. When the event conditions are true, the method includes testing the sensor relative to a reference to determine when the sensor is operating within reference criteria to produce a positive reference testing result. When the reference testing result is positive, the method directs the vehicle to return to normal operation, and otherwise directs the vehicle to be serviced.

25 Claims, 5 Drawing Sheets

(51) Int. Cl.
    *G01P 21/00*     (2006.01)
    *G07C 5/08*     (2006.01)
    *G05D 1/00*     (2006.01)

(56) References Cited

OTHER PUBLICATIONS

Kirkpatrick, James, et al., "Overcoming catastrophic forgetting in neural networks", arXiv:1612.00796v2 [cs.LG] Jan. 25, 2017, (2017), 13 pgs.

\* cited by examiner

SYSTEM AND METHOD FOR POST-ACCIDENT VEHICLE SENSOR TESTING

TECHNICAL FIELD

Described herein is a system and method for performing vehicle sensor testing after a vehicle accident and providing mechanisms for operating the vehicle if it has been partially damaged after the accident to move it to a safe location.

BACKGROUND

In order for an autonomous (or smart manually operated) vehicle to operate safely after an accident, it must be able to determine how its sensor network has been compromised. Damaged sensors may continue to send feedback to the system after an accident indicating that they are functional, but the data such sensors return may be faulty. If a system of the vehicle were to rely on this faulty data as if it were normal, the occupant(s) may be put at risk. In existing systems, an outside source is utilized to determine faulty sensors.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
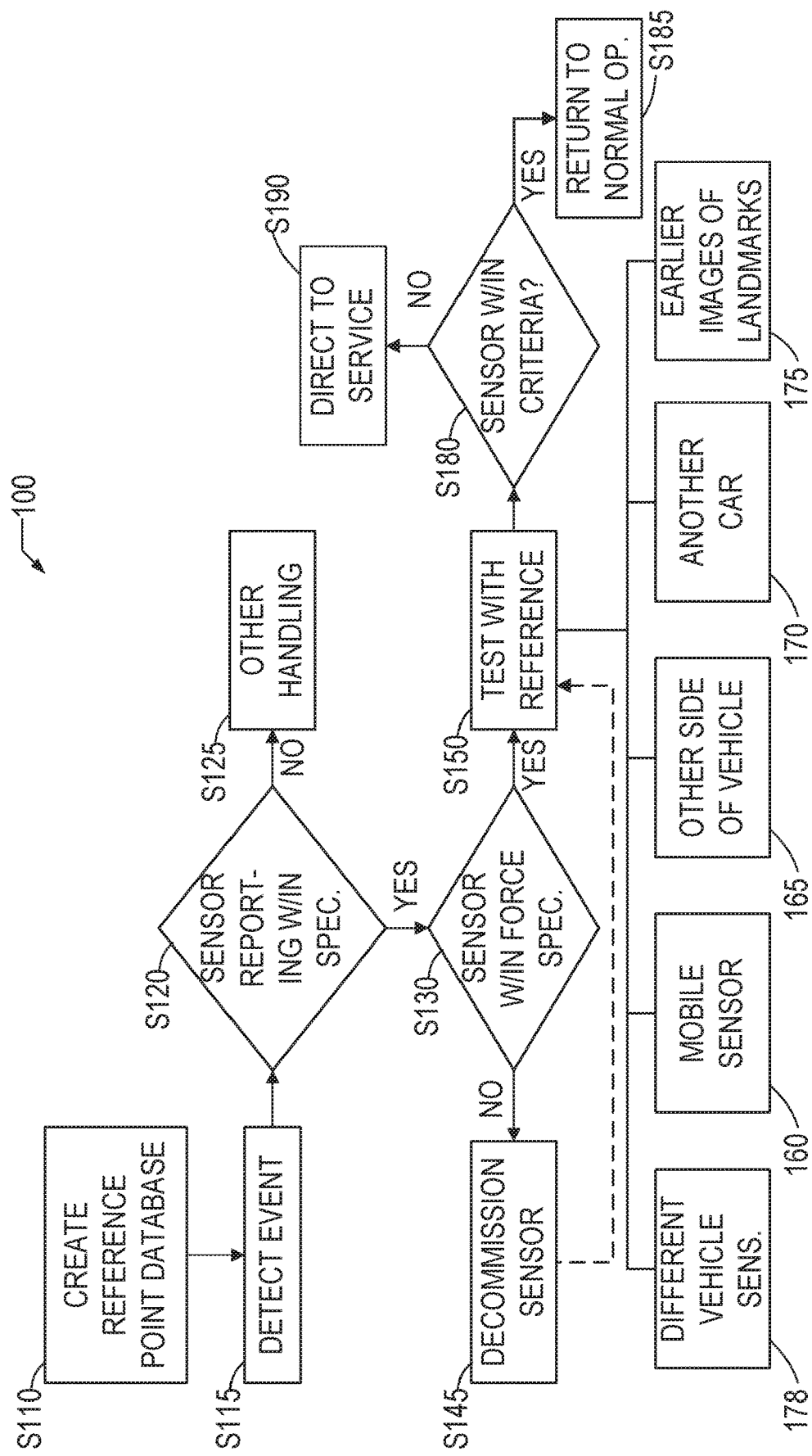
FIG. 1 is a flowchart that illustrates an example implementation of a process that may be used to determine the health of the sensors.

In the following description, for purposes of explanation, numerous specific details are set forth in order to provide a thorough understanding of some example implementations—however, one skilled in the art will recognize that the present disclosure may be practiced without these specific details.

Although the term "autonomous vehicle" is generally defined as a vehicle capable of travel without requiring a human, the term as used herein is defined to be any vehicle that may utilize sensor-based technology for any of its capabilities, which may include smart cars that may still require a human driver. The term "event" as used herein may describe any occurrence associated with the autonomous vehicle that may impact operation (e.g., damages, obscures, or otherwise interferes with operation) of one of its sensors. Thus, an event may range from a major event, such as a serious collision of the autonomous vehicle with another object, to relatively minor events such as a mud splash or camera lens blockage due to moisture in bad weather.

If an autonomous vehicle encounters an event, it is advantageous if that vehicle assesses the functioning of its sensors and makes an appropriate decision (or assists a human in making an appropriate decision) as to whether to continue operation of the vehicle or not, that is, whether to wait for a mechanic or tow truck. When an event is detected by the autonomous vehicle, the system tests the vehicle sensors using various approaches and may provide some capability to allow the vehicle to reach a location where full sensor functionality may be restored. One focus is thus making a determination as to whether the autonomous vehicle is drivable after an event and what to do with the vehicle when it is.

When the autonomous vehicle system detects that there has been an event that may damage sensors or interfere with sensor operation, it may begin testing the sensor array for functionality. The testing may determine a number of sensor states that may include: a) operating and outputting data within its specified range 1) accurately, and 2) inaccurately); b) operating and outputting data outside of its specified range; and c) not operating. Independent of these operating states, two additional operating states may apply to the sensor; d) sensor has not been subject to any excessive operating conditions; and e) sensor has been subject to excessive operating conditions.

Possible outcomes for the vehicle after sensor testing may include: a) vehicle is okay, return to normal vehicle operation; b) vehicle needs service but is drivable in a service mode to be serviced without assistance from another vehicle; c) vehicle needs service and is drivable in a service mode to be serviced with assistance from another vehicle; and d) vehicle is not drivable. By way of example, if a sensor is considered to be critically damaged and has failed one or more of the above-described tests (and another vehicle is not available or cannot properly assist), then the vehicle may be set to a "not-drivable" state and must wait to be towed or serviced in its current location.

As defined herein, a sensor refers to any type of physical detecting instrument, such as, but not limited to, red-blue-green (RBG) cameras, light detection and ranging (LIDAR) and radio detection and ranging (RADAR) sensors, accelerometers, gyroscopes, micro-electro-mechanical systems (MFM), pressure, cameras (2D, 3D, infra-red (IR), depth, etc.), microphones thermometers, ultrasonic sensors, capacitance sensors, other proximity sensors, radio receivers, location sensors, such as global positioning system (GPS) sensors, and other various sensing instruments. A sensor array is defined herein as a plurality of these sensors that are used together with one or more processors to provide information about the autonomous vehicle in its physical environment. Because these sensors work in conjunction with one another, it is important that the vehicle determine if any of them have been compromised. The sensors may be grouped inside of physical housings, and may communicate with one another or to a processor via a sensor communication bus.

FIG. 1 is a flowchart that illustrates an example implementation of a process 100 that may be used to determine the health of the sensors. Prior to operation of the system on a vehicle, in operation S110, a reference point database may be created. This database may reside in a networked cloud, in the vehicle, or on networked edge nodes or networked servers (or in any combination of these). The reference point database may include reference points, such as calibration data or landmark data, for future comparison. The landmark data may comprise, for example, image data for commonly encountered objects along a driving route, such as street signs, traffic lights, telephone poles, guardrails, safety cones, billboards, etc. This landmark data may then be used subsequently to determine proper operation of the sensor, such as a camera.

Although the use of landmarks may primarily be associated with imaging sensors, such as cameras, it is also possible to consider the landmarks in the context of other sensors as well. For example, the dimensions of the vehicle's garage from front to back may be known, and may be stored as a landmark for proximity sensors. After an accident, the vehicle may be parked in the garage and determine that there is a discrepancy in the garage dimensions using the proximity sensors, using the garage dimensional data as a landmark. This discrepancy suggests some level of damage with regard to a proximity sensor on the vehicle.

In operation S115, an event is detected. Certain types of events, such as collisions, may be detected with accelerometers or similar devices. The system may utilize normal sensors, such as accelerometers, that are used for normal operations (e.g., conditions associated with driving and parking the vehicle), but these may have been damaged in the collision. The system thus utilize special heavy-duty sensors, such as accelerometers that are designed to measure and withstand the forces associated with vehicle collisions. A collision or other event may also be detectable by heavy-duty motion or pressure sensors. Such heavy-duty sensors may be located on a physical container or housing that holds other sensors, and may be operable within a vehicle crash range of acceleration. For example, the vehicle crash range of acceleration may be from 5 g to 2000 g, which are g forces that would not occur during the course of normal driving, but might occur during an accident. By way of example, an accelerometer may register a 50 g force for one second, which suggests, according to predefined criteria, a collision with an object. Event detection may also occur based on measured operations of the sensors. For example, a "mud on the lens" event may be detected based on an inability for a camera to achieve a sharp focus on any object.

Once an event is detected, the system begins checking to see if various sensors are fully functioning. Such full functioning may be determined, in operation S120, by checking whether the sensor is providing data within a pre-defined range of acceptable sensor specification values, based on information about the sensor from a sensor information database. The sensor data may, in an implementation, be subject to further processing, and the pre-defined range of acceptable sensor specification values may include such further processing. If not (operation S120: NO), then some other handling of the damaged sensor may be provided in operation S125). If so (operation S120: YES), the system may then, in operation S130 determine whether or not those sensors have experienced unacceptable conditions, such as excessive levels of force, based on data that may be specific to each sensor. For example, physical impact above a certain threshold implies risk of damage. To illustrate, a camera may have an operable rating of up to 20 gs. However, if an accelerometer has reported a 50 g force, there is a possibility that the camera has been damaged, despite reporting in-range data.

The event detection S115 does not have to be an all-or-nothing determination. Different degrees of sensor testing may be implemented depending on the severity of the event. For example, only a limited number of sensors may need to be tested if the event is determined to be a left front tire hitting a pothole (e.g., right-side sensors may not need to be tested), whereas a frill head-on collision might require a sensor testing operation. The initial event may be evaluated for severity and the appropriate testing may be applied based on predefined criteria.

If the sensor has experienced unacceptable conditions (operation S130: NO), then in one implementation, the sensor (or group of sensors, such as a group of sensors sharing a common housing) may be decommissioned in operation S145. If such a decommissioned sensor is considered to be an essential sensor (such as a main imaging camera having no backup), then the car may be disabled for autonomous driving and set in a "not drivable" state. In one implementation, a decommissioned sensor is considered to be completely disabled and is not used for any purpose. However, in another implementation, a decommissioned sensor is not completely disabled and may be utilized to an extent that it is capable. By way of example, after an accident, a camera mounting may be bent somewhat so that it is no longer properly aligned such a misaligned camera may still be capable of producing useful image data, and thus could still be usable in a limited capacity, even though it does not have an optimal field of view. However, in this condition, the vehicle may be set to a "needs service state" with its primary mission being to go to a service location.

Although FIG. 1 shows a decommissioning of the sensor operation S145 only as a result of the sensor having been subjected to conditions exceeding its operational specification, any of the tests illustrated could result in a sensor being decommissioned. As noted above, a decommissioned sensor could either be disabled, or operable in a limited capacity or with certain conditions applied. In any case, the decommissioned sensor may be designated as such indicating that a service person should look at and potentially repair or replace the sensor. A decommissioned sensor may be recommissioned by recertifying at a service location or potentially by the autonomous vehicle testing system running a different more robust series of tests to determine that the sensor is operating properly.

As shown in FIG. 1 by a dashed line, in one implementation, the decommissioned sensor may still be subjected to testing against a reference in operation S150 as described below to determine if it may still be used, at least for moving the vehicle to a service location.

The general notion is that when a problem with a sensor is detected, the autonomous vehicle is sent to a service center as quickly as possible so that the sensor may be replaced or serviced. Efforts may thus be made to allow the vehicle the ability to get to a service center on its own or possibly with the assistance of another vehicle, but without requiring a tow. In one implementation, it may be possible to have other sensors help to compensate for a partially damaged sensor. For example, where a damaged camera has an overlapping field of view with another camera that is not damaged, the undamaged camera may take over some of the image processing from the damaged camera.

If the sensor has not experienced unacceptable conditions or if there is any ambiguity with respect to the test in operation S130, then (operation S130: YES), then the sensor, in operation S150, may be tested against one or more references. In some implementations, operation S130 is not essential, and even if the sensor was subjected to conditions by the event that exceed its specified operational parameters, provided the sensor passes subsequent tests, it may be deemed operable enough to use to get the vehicle in for servicing.

These other references may include, but are not limited to the following. In some instances, a mobile sensor 160, which may be a sensor of a wearable or mobile device of the user, may not have sustained the extremely high forces as a sensor at the front of a vehicle might have, and thus may properly serve as a reference for the test S150. In this situation, a comparison may be made to determine proper operation of the vehicle sensor. By way of example, a user's cell phone may have a temperature sensor on it. By comparing temperature values produced by a thermometer sensor on the cell phone with values produced by a thermometer sensor on the vehicle, a determination may be made as to the proper functioning of the vehicle thermometer sensor. Both may be presumed to be measuring ambient temperature. In one example, if the cell phone thermometer sensor reports 70° F. and the vehicle thermometer sensor reports 75° F., such a 5° F. variance may be considered to be within some predefined tolerance of acceptability, and correct operation of the vehicle thermometer sensor may be inferred. However, if the vehicle thermometer sensor reports 95° F., such a 20° F. variance may be considered to be outside of the predefined tolerance of acceptability, and some activity may then be taken with respect to the sensor, such as decommissioning the sensor S145, or some other activity. The results thus may be compared to a similar type of sensor that is defined herein as a sensor or combination of sensors producing a measurement of a common physical variable such sensors do not have to be constructed in the same manner. For example, a force-based accelerometer may be considered a similar type of sensor to a video camera with an image analysis component that is able to determine acceleration from a series of video images. A "similar type" of sensor is not limited to a sensor that is constructed similarly or operates on a same principle as another sensor.

In another example, a camera (as a mobile sensor 160) of the mobile device may be used to capture an image, and this image may be compared to an image captured by a camera sensor of the vehicle. Various image comparison algorithms may be employed to determine if the vehicle camera is capturing acceptable images or not. The user's mobile device or wearable could contain an RGB camera, accelerometer, GPS, temperature sensor, and other types of sensors that may be utilized in this operation.

In another instance, a symmetrical sensor from the other side of the vehicle 165 may be used to test against as a reference S150. A vehicle may have sustained damage (or been subject to significant forces) on only one side of the vehicle, and thus a symmetrical sensor from the other side may provide values that can be compared to determine proper operation. For example, if the vehicle hit a large pothole with the left front tire, a camera on the right side of the vehicle may serve as a reference to determine proper operation of a potentially damaged camera on the left side of the vehicle. Such a determination could be useful for determining alignment, focus, clarity, and other imaging parameters when the sensor is a camera, and could be useful for determining other parameters for other types of sensors. In this instance, if the vehicle can be taken to a location that allows some mobility (such as, for example, a parking lot), then a camera on one side of the vehicle may capture a first image of a scene, and the vehicle may then be repositioned so that a camera on the other side of the vehicle may capture a second image of the same scene, which permits the two images of the same scene to be compared.

In one implementation, higher level imaging functions lane recognition, intersection object avoidance) may be handled by processors dedicated to a respective camera (e.g., a right camera processor for right camera images, and a left camera processor for left camera images). In the event that a camera is still operating acceptably but that it is determined that its processor has been damaged, it may be possible to transfer the processing to another processor capable of performing the processing. For example, if the right camera processor is damaged, the right camera's images may be transferred to the left camera processor, thereby effectively doubling the processing load on the left camera processor. The increased load may decrease the performance/response time of the processor, but this may result in adequate performance to get the vehicle to a service station. Put differently, if two or more sensor arrays share a communications bus, it may be possible to transfer the information to a difference CPU for processing at a reduced speed.

In another instance, another vehicle 170 comprising similar sensors may be used to test against as a reference S150. In this example, the other vehicle 170 may be contacted (either directly or indirectly via a third-party service) to go to the vicinity of the event vehicle. Once it arrives, operational parameters of various sensors of the event vehicle may be compared to operational parameters of similar various sensors of the other vehicle 170. For example, the temperature sensor of the event vehicle may be compared against the temperature sensor of the other vehicle 170 in a manner similar to that described above with respect to the temperature sensor of the cell phone.

In another instance, an earlier image of a landmark 175 taken prior to the event may be used to test against as a reference S150. The landmark 175 may be stored in the landmark database as described above, and the image data of pre- and post-event landmarks may be compared for alignment, clarity, focus, or other parameters.

The system may initiate various actions given a particular reference test S150. For example, the system may: a) instruct the user to manually drive the car so that the sensor array on the other side of the car may check landmarks for comparison; b) automatically maneuver the car to acquire an image for comparison or maneuver to a previously recorded landmark; c) instruct the user to record an image with a smartphone or other device for comparison; contact another car to drive to the site of the incident to perform sensor comparisons. The other car may have comparable sensors to allow an optimal comparison. If the test against the reference shows a disparity, then the system may categorize the sensor as non-usable. If the test shows a good match, the sensor may be classified as functioning.

An inference routine in an autonomous vehicle may rely on particular subsets of working sensors (e.g., LIDAR plus camera for pedestrian recognition or audio plus camera for in-cabin activity/emotion recognition). This approach supports an accurate and multimodal representation of real events in the environment. If an accident slightly affects a particular sensor, the interactive nature of how training and inference routines find patterns across sensors can turn multiplicative and exponentially expand the small and tolerable noise of an isolated and damaged sensor. This may lead for example to catastrophic forgetting in neural networks or death activations when computing gradients. To deal with this, multi-sensor calibration may be performed given corresponding tasks and a decommissioning strategy in which if a sensor is part of the subset of sensors responsible for an inference task: a) the other sensors also become decommissioned; or b) just the task becomes decommissioned, giving the working sensors a chance to be part of other tasks.

The test with reference S150 operation may be responsible for coordinating reference tests. It may access the landmark database to determine the opportunity for nearby landmarks that were previously recorded, and it may record with sensors in the immediate vicinity. Recordings (especially images from various types of cameras and LiDAR) may be compared, for example, with various feature descriptor approaches that are well known (e.g., Scale Invariant Feature Transform (SIFT), Rotation Invariant Feature Transform (RIFT), or Speeded Up Robust Feature (SURF)). Other sensors in the car may factor in as well. For example, when sensors on opposite sides of the car are compared, gyroscope and compass data may be used to determine the direction and tilt of the car so that non-matching is not due to orientation of the whole car.

The test with reference S150 may perform tests using other sensors of the vehicle in combination 178. For example, a pair of cameras on each side of the vehicle may be determined as operating normally, and these cameras, using triangulation or other form of distance measuring, determine that there is a telephone pole six feet in front of the vehicle. However, a proximity sensor in the front of the vehicle that should detect the telephone pole as well reports no such obstacle. Based on such an analysis, the system may determine that a problem exists with the proximity sensor.

Whatever mechanism is utilized to test the sensor against a reference in operation S150, some determination is made in operation S180 as to whether the sensor is operating within normal criteria. When the sensor is operating within normal criteria (S180: YES), then normal operation of the sensor is presumed, and when all relevant sensors have been tested and appear to be operating normally (the reference testing result is positive), the autonomous vehicle may be returned to normal operation in operation S185. When the sensor is not operating within normal criteria (S180: NO), the autonomous vehicle may be directed for servicing of the sensor S190. Although not illustrated in the flowchart, when the sensor is not operating within its normal criteria and the sensor is defined by some predefined criteria to be a critical sensor, then the vehicle may be deemed inoperable and not further autonomously moved. For example, it may be determined that a critical camera sensor is now generating a significant amount of noise to the extent that objects in the vehicle's path cannot be determined with accuracy, even though the camera itself is producing valid image data.

Figure 2:
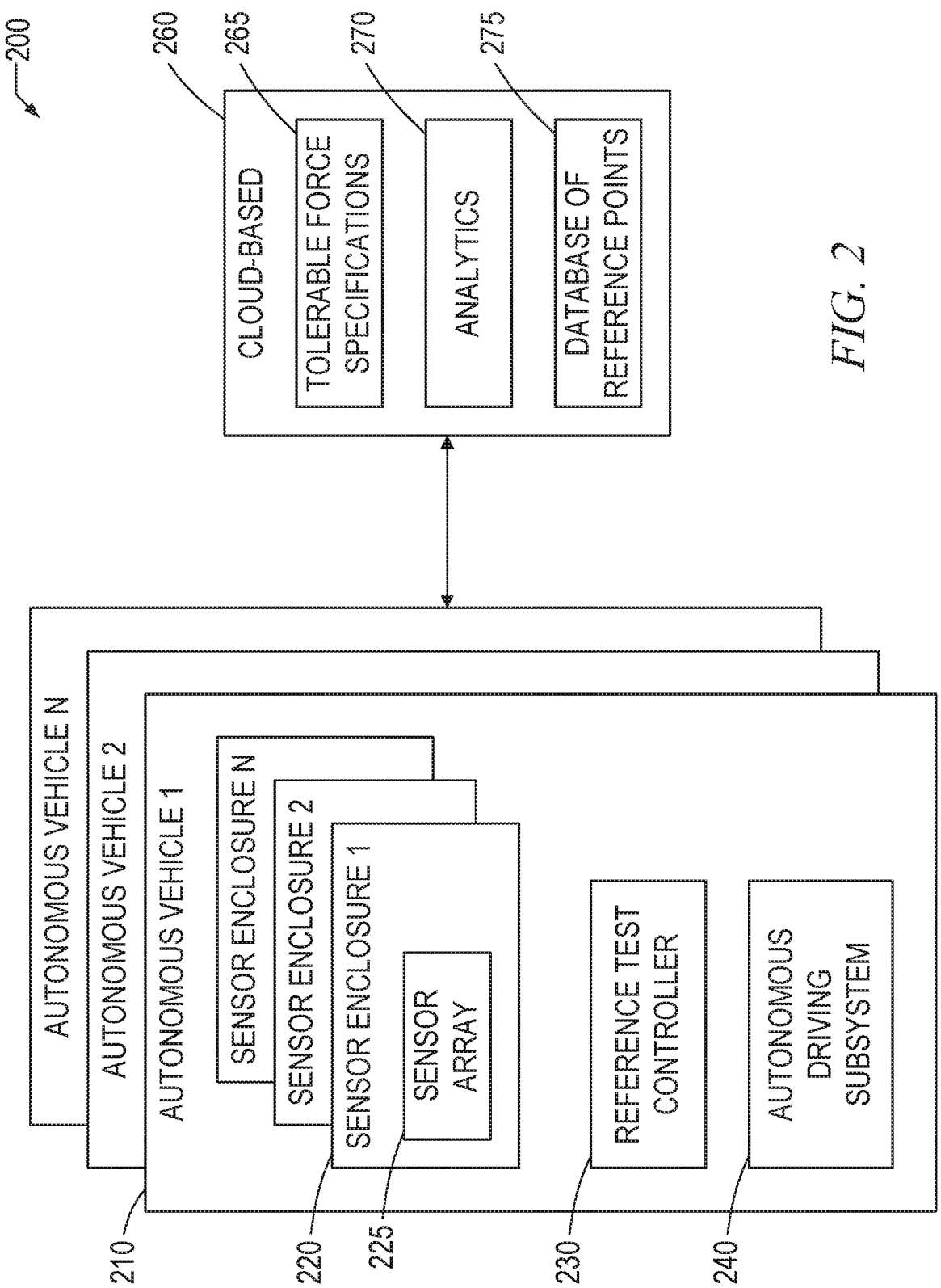
FIG. 2 is a block diagram showing an example implementation of a system on which the process of FIG. 1 may be utilized.

FIG. 2 is a block diagram showing an example implementation of a system 200 on which the process 100 may be utilized. Each autonomous vehicle 210 may comprise a sensor enclosure 220, which may be a physical enclosure for a circuit board or other element having sensors forming a sensor array 225 on it. The enclosure or attachment to a given sensor array may itself comprise a sensor that senses whether the sensor array 225 had been exposed to forces beyond acceptable tolerances for the array. These tolerances may vary by many factors such as: how essential the array is for autonomous driving, the location on the car relative to impact, the type of forces recorded (e.g., gs vs. torque), the type of sensor, or other factors. The enclosure 220 may fully enclose the array, or it may simply attach to the array 225 to monitor forces.

The sensor array 225 may be the sensor array discussed above. The vehicle 210 may further comprise a reference test controller 230 that is utilized in performing the reference test operation(s) S150 described above. The vehicle 210 also comprises an autonomous 240 (or semi-autonomous) driving subsystem that controls various aspects of vehicle operation.

The autonomous vehicles 210 may interface to cloud-based system 260 elements (various elements may be implemented in edge nodes, on the vehicle, on servers, or at locations according to a wide variety of architectures). These elements may include a database of tolerable force specifications 265 for each or the sensors or sensor groups. In addition to force specifications, this database may include various metrics for each of the sensors, such as tolerable force specifications, normal operating ranges, test specifications and procedures, and the like. Information from the tolerable force specifications 265 may be initially provided by a sensor manufacturer or third-party familiar with the particular sensor technology. Updated sensor information may be distributed from the cloud to the vehicle, edge nodes, or other computing processors. In general, operations that require immediate sensor analysis, such as LIDAR, require low latency analysis, so these operations and their associated data may take place at the autonomous vehicle. Information about navigation, updates on specifications, cars in the vicinity that are compatible, and other information involving operations that are of a less immediate nature may be more cloud-based (and such operations and data may be shared as well, such as in a client-server architecture). Some trigger, based on a particular event (e.g., parking the autonomous vehicle), may cause an update (data, software) to the car. Or, if another type of event is detected, the autonomous vehicle may check the cloud to see if there are any updates of information. The cloud-based system 260 may also include various analytics 270 used in any of the tests described above, and may include a database of reference points 275, such as the landmark data described above.

Figure 3:
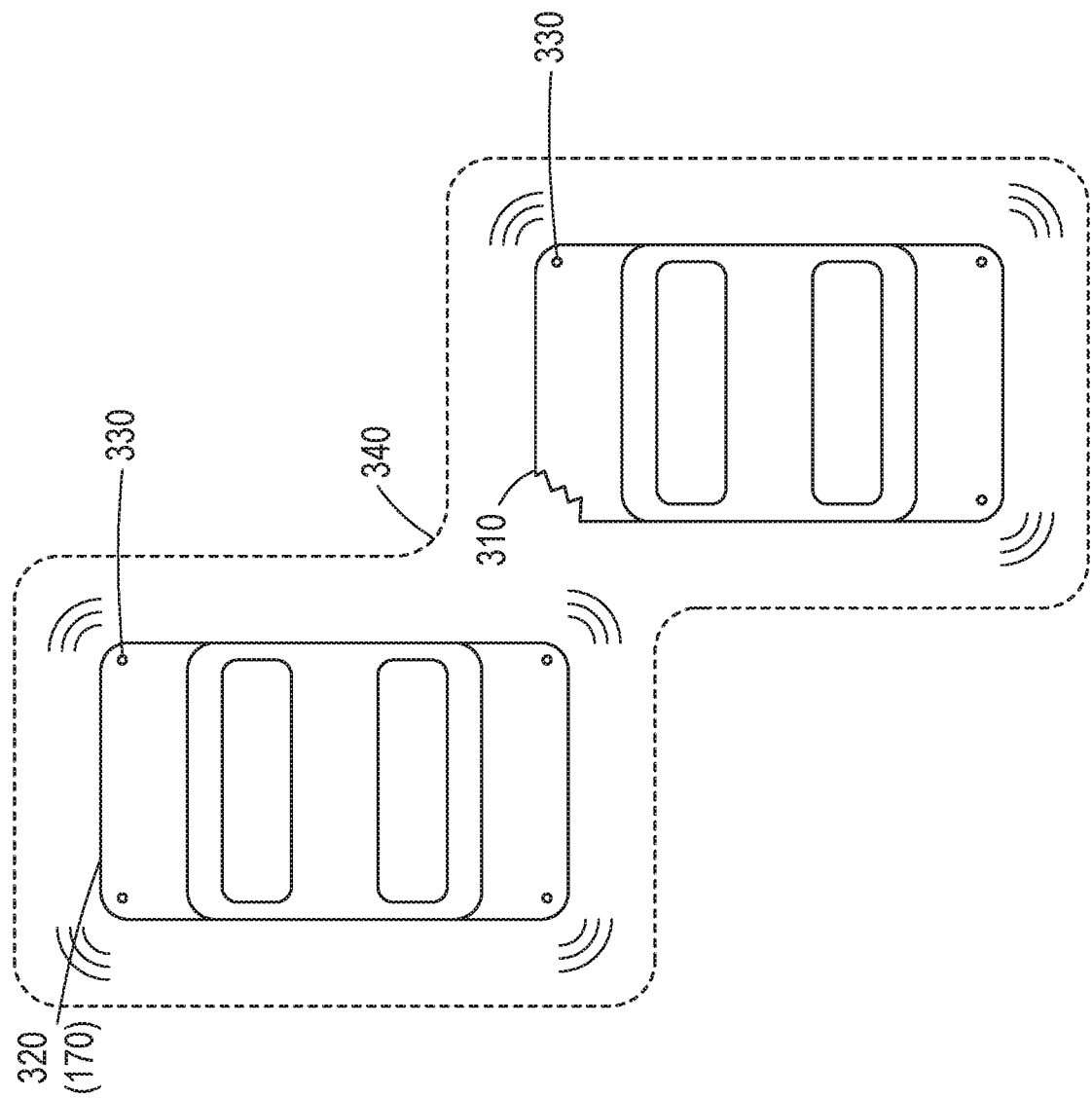
FIG. 3 is a pictorial diagram illustrating a damaged vehicle and another helping vehicle.

FIG. 3 is a pictorial diagram illustrating a damaged vehicle 310 and another helping vehicle 320 (170). In addition to another vehicle (as described above with respect to FIG. 1, 170) providing undamaged sensors for use as a reference with which to test the sensors of the vehicle experiencing an event, it is also possible that the helping vehicle 320 may assist the damaged autonomous vehicle 310 in reaching a service center when it may not be able to do so on its own. As shown in FIG. 3 both the damaged vehicle 310 and the helping vehicle 320 have imaging sensors at vehicle corners. However, the upper left sensor on the damaged vehicle 310 has been decommissioned and is no longer usable. According to one implementation, field of view 340 information of the cars based on functioning sensors/cameras 330 may be shared with each other, and by sharing such field of view 340 information, the damaged vehicle 310 may be able to semi-autonomously (i.e., with the assistance of the helping vehicle 320) reach a service center without requiring human intervention.

In one implementation, such a helping vehicle 320 may be automatically summoned by the damaged vehicle 310, which may provide GPS or other location information to available helping vehicles 320. Available helping vehicles 320 may be a group of vehicles dedicated in assisting other vehicles in need of assistance, or they may simply be other autonomous vehicles that are not currently active in a transportation activity, such as those that may be parked in a parking lot while the vehicle owner is at work. In such situations, a damaged vehicle 310 may contact potential helping vehicles 320 in a manner similar to the operation of conventional ride-sharing services, where a fee is paid for any capable vehicle willing to assist the damaged vehicle 310. Where the helping vehicle 320 is being used for reference testing of the sensors, the helping vehicle 320 may be one that has similar sensors.

Remedial action for a partially damaged autonomous vehicle may involve, where safe to do so, driving at a lower speed, restricting driving to the slowest lane or shoulder (if permitted), taking back roads to get to a service center, accessing a vehicle wash (where the event, such as mud on the camera lens, can be fixed by cleaning), etc.

The communications used for communicating between vehicles, between the vehicle and the cloud, and between the vehicle and any other device such as a smart phone, edge computer, and the like, may be implemented using any form of standardized cellular or network wireless communications that provide adequate speed and response time.

General Device and Cloud Architecture

Figure 4:
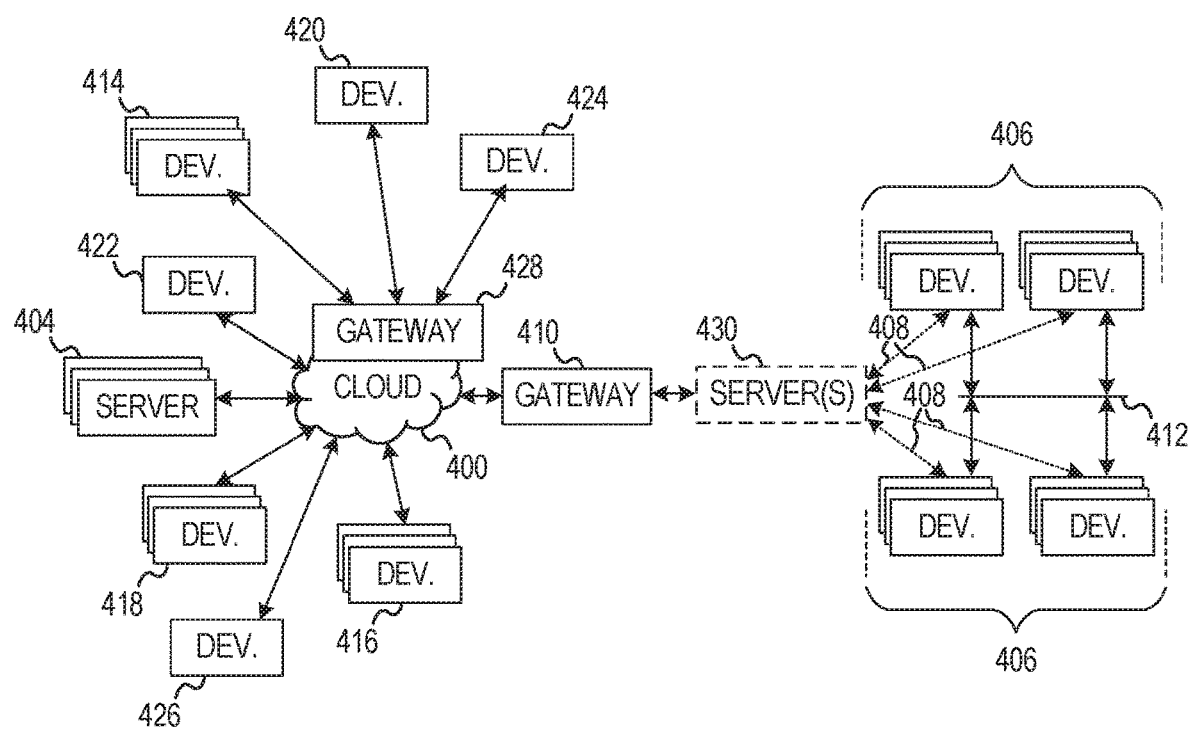
FIG. 4 is a block diagram of a cloud computing network, or cloud 400 in communication with a number of devices, which may include Internet of Things (IoT) devices, sensors, and sensor arrays along with their associated processors.

FIG. 4 illustrates a drawing of a cloud computing network, or cloud 400, in communication with a number of devices, which may include Internet of Things (IoT) devices, sensors, and sensor arrays 225 along with their associated processors. The cloud 400 may represent the Internet, or may be a local area network (LAN), or a wide area network (WAN), such as a proprietary network for a company. The cloud 260 discussed above may be such a cloud 400 The devices may include any number of different types of devices, grouped in various combinations. For example, a traffic control group 406 may include devices along streets in a city. These devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the devices to communicate with each other, such as through a local area network, a wireless local area network, and the like. The devices may use another device, such as a gateway 410 or 428 to communicate with remote locations such as the cloud 400; the devices may also use one or more servers 430 to facilitate communication with the cloud 400 or with the gateway 410. For example, the one or more servers 430 may operate as an intermediate network node to support a local edge cloud or fog implementation among a local area network. Further, the gateway 428 that is depicted may operate in a cloud-to-gateway-to-many edge devices configuration, such as with the various devices 414, 420, 424 being constrained or dynamic to an assignment and use of resources in the cloud 400.

Other example groups of devices may include remote weather stations 414, local information terminals 416, alarm systems 418, automated teller machines 420, alarm panels 422, or moving vehicles, such as emergency vehicles 424 or other vehicles 426, among many others. Each of these devices may be in communication with other devices, with servers 404, with another IoT fog device or system (not shown, but depicted in FIG. 2), or a combination therein. The groups of devices may be deployed in various residential, commercial, and industrial settings (including in both private or public environments).

As can be seen from FIG. 4, a large number of devices may be communicating through the cloud 400. This may allow different devices to request or provide information to other devices autonomously. For example, a group of devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection in sufficient time for the emergency vehicle 424 to have unimpeded access to the intersection.

Clusters of devices, such as the remote weather stations 414 or the traffic control group 406, may be equipped to communicate with other devices as well as with the cloud 400. This may allow the devices to form an ad-hoc network between the devices, allowing them to function as a single device, which may be termed a fog device or system (e.g., as described above with reference to FIG. 2).

Figure 5:
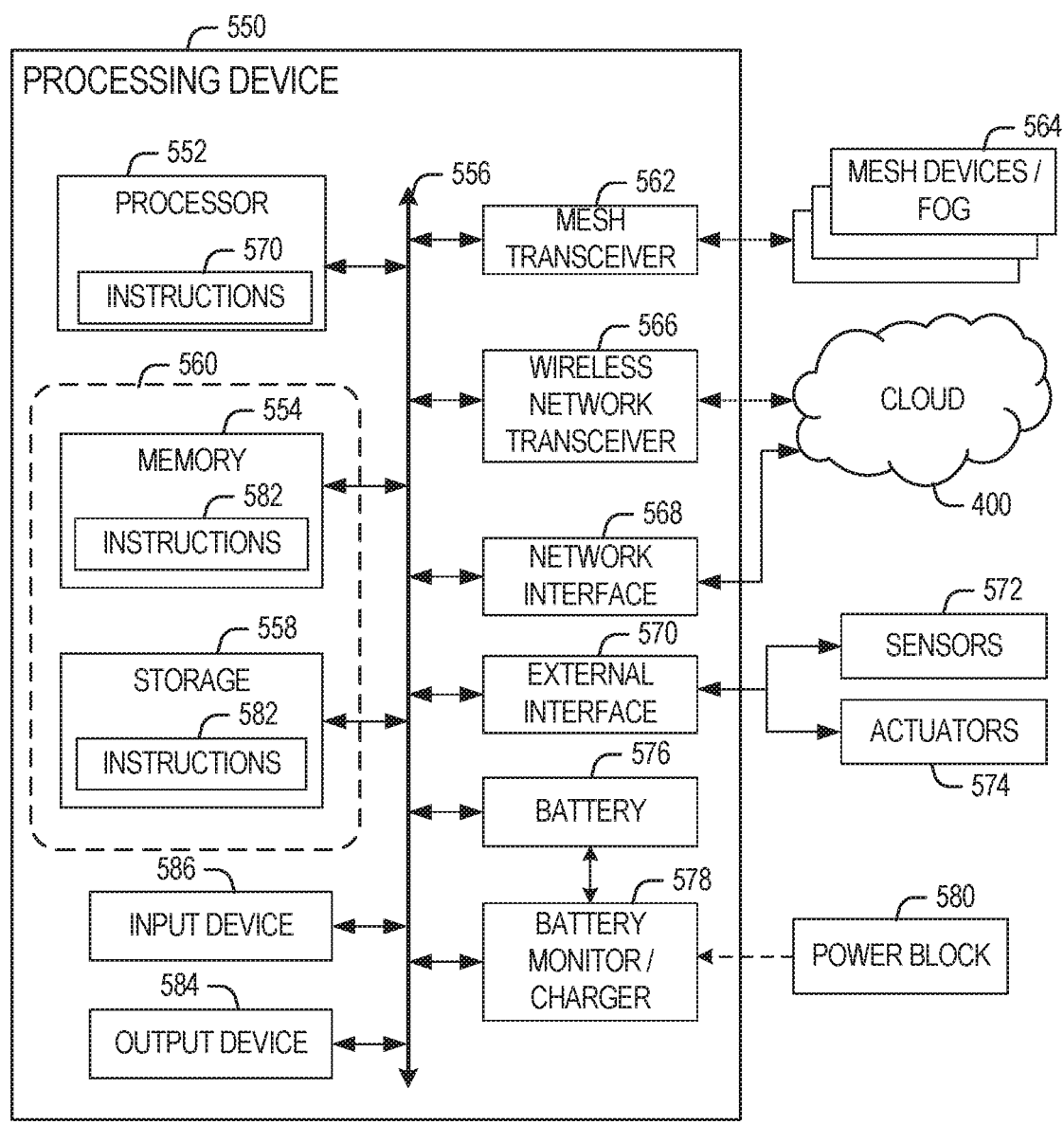
FIG. 5 is a block diagram of an example of components that may be present in a device for implementing the techniques described herein.

FIG. 5 is a block diagram of an example of components that may be present in a device 550 for implementing the techniques described herein. The device 550 may include any combinations of the components shown in the example or referenced in the disclosure above. The components may be implemented as ICs, portions thereof, discrete electronic devices, or other modules, logic, hardware, software, firmware, or a combination thereof adapted in the device 550, or as components otherwise incorporated within a chassis of a larger system. Additionally, the block diagram of FIG. 5 is intended to depict a high-level view of components of the device 550. However, some of the components shown may be omitted, additional components may be present, and different arrangement of the components shown may occur in other implementations.

The device 550 may include a processor 552, which may be a microprocessor, a multi-core processor, a multithreaded processor, an ultra-low voltage processor, an embedded processor, or other known processing element. The processor 552 may be a part of a system on a chip (SoC) in which the processor 552 and other components are formed into a single integrated circuit, or a single package, such as the Edison™ or Galileo™ SoC boards from Intel. As an example, the processor 552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 552 may communicate with a system memory 554 over an interconnect 556 (e.g., a bus). Any number of memory devices may be used to provide for a given amount of system memory. As examples, the memory may be random access memory (RAM) in accordance with a Joint Electron devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (QDP). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 558 may also couple to the processor 552 via the interconnect 556. In an example the storage 558 may be implemented via a solid state disk drive (SSDD). Other devices that may be used for the storage 558 include flash memory cards, such as SD cards, microSD cards, xD picture cards, and the like, and USB flash drives. In low power implementations, the storage 558 may be on-die memory or registers associated with the processor 552. However, in some examples, the storage 558 may be implemented using a micro hard disk drive (HDD). Further, any number of new technologies may be used for the storage 558 in addition to, or instead of, the technologies described, such resistance change memories, phase change memories, holographic memories, or chemical memories, among others.

The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 556 may be a proprietary bus, for example, used in a SoC based system. Other bus systems may be included, such as an I2C interface, an SPI interface, point to point interfaces, and a power bus, among others.

The interconnect 556 may couple the processor 552 to a mesh transceiver 562, for communications with other mesh devices 564. The mesh transceiver 562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 562 may communicate using multiple standards or radios for communications at different range. For example, the device 550 may communicate with close devices, e.g., within about 10 meters, using a local transceiver based on BLE, or another low power radio, to save power. More distant mesh devices 564, e.g., within about 40 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 566 may be included to communicate with devices or services in the cloud 500 via local or wide area network protocols. The wireless network transceiver 566 may be a LPWA transceiver that follows the IEEE 802.15.4, or IEEE 802.15.4g standards, among others. The device 550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 562 and wireless network transceiver 566, as described herein. For example, the radio transceivers 562 and 566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 562 and 566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 4th Generation (5G) communication systems, a Global System for Mobile Communications (GSM) radio communication technology, a General Packet Radio Service (CPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 566, including, for example, radios compliant with standards issued by the ITU (International Telecommunication Union), or the ETSI (European Telecommunications Standards institute), among others. The examples provided herein are thus understood as being applicable to various other communication technologies, both existing and not yet formulated.

A network interface controller (NIC) 568 may be included to provide a wired communication to the cloud 500 or to other devices, such as the mesh devices 564. The wired communication may provide an Ethernet connection, or may be based on other types of networks, such as Controller Area Network (CAN), Local Interconnect Network (LIN), deviceNet, ControlNet, Data Highway+, PROFIBUS, or PROFINET, among many others. An additional NIC 568 may be included to allow connect to a second network, for example, a NIC 568 providing communications to the cloud over Ethernet, and a second NIC 568 providing communications to other devices over another type of network.

The interconnect 556 may couple the processor 552 to an external interface 570 that is used to connect external devices or subsystems. The external devices may include sensors 572, such as accelerometers, level sensors, flow sensors, optical light sensors, camera sensors, temperature sensors, a global positioning system (GPS) sensors, pressure sensors, barometric pressure sensors, and the like. The external interface 570 further may be used to connect the device 550 to actuators 574, such as power switches, valve actuators, an audible sound generator, a visual warning device, and the like.

In some optional examples, various input/output (I/O) devices may be present within, or connected to, the device 550. For example, a display or other output device 584 may be included to show information, such as sensor readings or actuator position. An input device 586, such as a touch screen or keypad may be included to accept input. An output device 584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 550.

A battery 576 may power the device 550, although in examples in which the device 550 is mounted in a fixed location, it may have a power supply coupled to an electrical grid. The battery 576 may be a lithium ion battery, or a metal-air battery, such as a zinc-air battery, an aluminum-air battery, a lithium-air battery, and the like.

A battery monitor/charger 578 may be included in the device 550 to track the state of charge (SoCh) of the battery 576. The battery monitor/charger 578 may be used to monitor other parameters of the battery 576 to provide failure predictions, such as the state of health (SoH) and the state of function (SoF) of the battery 576. The battery monitor/charger 578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 578 may communicate the information on the battery 576 to the processor 552 over the interconnect 556. The battery monitor/charger 578 may also include an analog-to-digital (ADC) convertor that allows the processor 552 to directly monitor the voltage of the battery 576 or the current flow from the battery 576. The battery parameters may be used to determine actions that the device 550 may perform, such as transmission frequency, mesh network operation, sensing frequency, and the like.

A power block 580, or other power supply coupled to a grid, may be coupled with the battery monitor/charger 578 to charge the battery 576. In some examples, the power block 580 may be replaced with a wireless power receiver to obtain the power wirelessly, for example, through a loop antenna in the device 550. A wireless battery charging circuit, such as an LTC4020 chip from Linear Technologies of Milpitas, Calif., among others, may be included in the battery monitor/charger 578. The specific charging circuits chosen depend on the size of the battery 576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 558 may include instructions 582 in the form of software, firmware, or hardware commands to implement the techniques described herein. Although such instructions 582 are shown as code blocks included in the memory 554 and the storage 558, it may be understood that any of the code blocks may be replaced with hardwired circuits, for example, built into an application specific integrated circuit (ASIC).

In an example, the instructions 582 provided via the memory 554, the storage 558, or the processor 552 may be embodied as a non-transitory, machine readable medium 560 including code to direct the processor 552 to perform electronic operations in the device 550. The processor 552 may access the non-transitory, machine readable medium 560 over the interconnect 556. For instance, the non-transitory, machine readable medium 560 may be embodied by devices described for the storage described above, or may include specific storage units such as optical disks, flash drives, or any number of other hardware devices. The non-transitory, machine readable medium 560 may include instructions to direct the processor 552 to perform a specific sequence or flow of actions, for example, as described with respect to the flowcharts) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

ADDITIONAL NOTES & EXAMPLES

The following are Examples related to that above.

Example 1 is a sensor testing apparatus of a vehicle, the apparatus comprising: a sensor testing system processor to: determine when event conditions are true that comprise: an occurrence of a predefined event is detected that impacts a sensor of the vehicle; and after the predefined event is detected, the sensor outputs sensor values within sensor specification values; and when the event conditions are true, test the sensor relative to a reference to determine when the sensor operates within reference criteria to produce a positive reference testing result; when the reference testing result is positive, direct the vehicle to return to normal operation, and otherwise direct the vehicle to be serviced.

In Example 2, the subject matter of Example 1 includes, wherein a further event condition is that the sensor has operated within sensor operational specification values during the predefined event.

In Example 3, the subject matter of Example 2 includes, when the sensor has operated outside of the sensor operational specification, the sensor testing processor is to decommission the sensor.

In Example 4, the subject matter of Examples 1-3 includes, wherein the sensor testing processor, for the test of the sensor relative to a reference, is to: receive sensor information from a user device sensor of a device from a user, wherein the user device sensor is a similar type to the sensor; and determine when information received from the sensor is within a predefined range of the information received from the user device sensor.

In Example 5, the subject matter of Examples 1-4 includes, wherein the sensor testing processor, for the test of the sensor relative to a reference, is to: receive sensor information from a different location sensor in a different location on the vehicle, wherein the different location sensor is a similar type to the sensor; and determine when information received from the sensor is within a predefined range of the information received from the different location sensor.

In Example 6, the subject matter of Examples 1-5 includes, wherein the sensor testing processor, for the test of the sensor relative to a reference, is to: receive sensor information from an other vehicle sensor of an other vehicle located proximate the vehicle, wherein the other vehicle sensor is a similar type to the sensor; and determine when information received from the sensor is within a predefined range of the information received from the other vehicle sensor.

In Example 7, the subject matter of Examples 1-6 includes, wherein the sensor testing processor, for the test of the sensor relative to a reference, is to: receive sensor information from a landmark captured after the predefined event is detected; and determine when information received from the sensor is within a predefined range of information received from the landmark captured before the predefined event is detected.

In Example 8, the subject matter of Examples 1-7 includes, wherein the sensor is at least one of a red-blue-green (RBG) camera, a light detection and ranging (LIDAR) sensor, an accelerometer, a gyroscope, a micro-electro-mechanical system (MEMs), a pressure sensor, 2D camera, a 3D camera, an infra-red (IR) camera, a depth camera, a microphone, a thermometer, a proximity sensor, a location sensor, ultrasonic sensor, radio detection and ranging (RADAR), radio receiver, capacitance sensor, or a global positioning system (GPS) sensor.

In Example 9, the subject matter of Examples 1-8 includes, wherein the sensor testing processor is operable for determination of the occurrence of the predefined event is to detect an acceleration value from a heavy-duty accelerometer, motion, or pressure sensor whose normal operating specifications are within a vehicle crash range of acceleration.

In Example 10, the subject matter of Examples 1-9 includes, wherein the sensor testing processor is further to: determine, according to a predefined critical sensor criteria, when the sensor is a critical sensor as a first critical sensor condition, and when the reference testing result is negative as a second critical sensor condition; and when the first and second critical sensor conditions are both true, direct the vehicle to be in a not-drivable state and to remain at its current location.

In Example 11, the subject matter of Examples 1-10 includes, wherein the sensor testing processor is further to: collect and store landmark data prior to the occurrence of the predefined event.

In Example 12, the subject matter of Examples 1-11 includes, wherein the sensor testing processor is further to: contact an assist vehicle to assist in driving to a service location; and utilize information from an assisting sensor of the assist vehicle when the vehicle has been directed to be serviced.

In Example 13, the subject matter of Examples 1-12 includes, wherein the sensor testing processor is further to: receive the operational specification values from an external source.

In Example 14, the subject matter of Example 13 includes, wherein the external source is a networked cloud-based sensor testing processor, edge node, or remote server.

Example 15 is a method performed by a sensor testing apparatus of a vehicle comprising: a sensor testing processor; and a memory coupled to the sensor testing processor, the method comprising: determining when event conditions are true that comprise: an occurrence of a predefined event is detected that impacts a sensor of the vehicle; and after the predefined event is detected, the sensor is outputting sensor values within sensor specification values; and when the event conditions are true, testing the sensor relative to a reference to determine when the sensor is operating within reference criteria to produce a positive reference testing result; when the reference testing result is positive, directing the vehicle to return to normal operation, and otherwise directing the vehicle to be serviced.

In Example 16, the subject matter of Example 15 includes, wherein a further event condition is that the sensor has operated within sensor operational specification values during the predefined event.

In Example 17, the subject matter of Example 16 includes, when the sensor has operated outside of the sensor operational specification, decommissioning the sensor.

In Example 18, the subject matter of Examples 15-17 includes, wherein the testing of the sensor relative to a reference comprises: receiving sensor information from a user device sensor of a device from a user, wherein the user device sensor is a similar type to the sensor; and determining when information received from the sensor is within a predefined range of the information received from the user device sensor.

In Example 19, the subject matter of Examples 15-18 includes, wherein the testing of the sensor relative to a reference comprises: receiving sensor information from a different location sensor in a different location on the vehicle, wherein the different location sensor is a similar type to the sensor; and determining when information received from the sensor is within a predefined range of the information received from the different location sensor.

In Example 20, the subject matter of Examples 15-19 includes, wherein the testing of the sensor relative to a reference comprises: receiving sensor information from an other vehicle sensor of an other vehicle located proximate the vehicle, wherein the other vehicle sensor is a similar type to the sensor; and determining when information received from the sensor is within a predefined range of the information received from the other vehicle sensor.

In Example 21, the subject matter of Examples 15-20 includes, wherein the testing of the sensor relative to a reference comprises: receiving sensor information from a landmark captured after the predefined event is detected; and determining when information received from the sensor is within a predefined range of information received from the landmark captured before the predefined event is detected.

In Example 22, the subject matter of Examples 15-21 includes, wherein the sensor is at least one of: a red-blue-green (RBG) camera, a light detection and ranging (LIDAR) sensor, an accelerometer, a gyroscope, a micro-electro-mechanical system (MEMs), a pressure sensor, 2D camera, a 3D camera, an infra-red (IR) camera, a depth camera, a microphone, a thermometer, a proximity sensor, a location sensor, ultrasonic sensor, radio detection and ranging (RADAR), radio receiver, capacitance sensor, or a global positioning system (GPS) sensor.

In Example 23, the subject matter of Examples 15-22 includes, wherein the determining of the occurrence of the predefined event comprises detecting an acceleration value from a heavy-duty accelerometer, motion, or pressure sensor whose normal operating specifications are within a vehicle crash range of acceleration.

In Example 24, the subject matter of Examples 15-23 includes, determining, according to a predefined critical sensor criteria, when the sensor is a critical sensor as a first critical sensor condition, and when the reference testing result is negative as a second critical sensor condition; and when the first and second critical sensor conditions are both true, directing the vehicle to be in a not-drivable state and to remain at its current location.

In Example 25, the subject matter of Examples 15-24 includes, collecting and storing landmark data prior to the occurrence of the predefined event.

In Example 26, the subject matter of Examples 15-25 includes, contacting an assist vehicle to assist in driving to a service location; and utilizing information from an assisting sensor of the assist vehicle when the vehicle has been directed to be serviced.

In Example 27, the subject matter of Examples 15-26 includes, receiving the operational specification values from an external source.

In Example 28, the subject matter of Example 27 includes, wherein the external source is a networked cloud-based sensor testing processor, edge node, or remote server.

Example 29 is at least one machine-readable medium including instructions, which when executed by a sensor testing processor of a sensor testing apparatus, cause the sensor testing processor to: determine when event conditions are true that comprise: an occurrence of a predefined event is detected that impacts a sensor of the vehicle; and after the predefined event is detected, the sensor outputs sensor values within sensor specification values; and when the event conditions are true, test the sensor relative to a reference to determine when the sensor operates within reference criteria to produce a positive reference testing result; when the reference testing result is positive, direct the vehicle to return to normal operation, and otherwise direct the vehicle to be serviced.

In Example 30, the subject matter of Example 29 includes, wherein a further event condition is that the sensor has operated within sensor operational specification values during the predefined event.

In Example 31, the subject matter of Example 30 includes, when the sensor has operated outside of the sensor operational specification, the sensor testing processor is to decommission the sensor.

In Example 32, the subject matter of Examples 29-31 includes, wherein the sensor testing processor, for the test of the sensor relative to a reference, is to: receiving sensor information from a user device sensor of a device from a user, wherein the user device sensor is a similar type to the sensor; and determining when information received from the sensor is within a predefined range of the information received from the user device sensor.

In Example 33, the subject matter of Examples 29-32 includes, wherein the sensor testing processor, for the test of the sensor relative to a reference, is to: receive sensor information from a different location sensor in a different location on the vehicle, wherein the different location sensor is a similar type to the sensor; and determine when information received from the sensor is within a predefined range of the information received from the different location sensor.

In Example 34, the subject matter of Examples 29-33 includes, wherein the sensor testing processor, for the test of the sensor relative to a reference, is to: receive sensor information from an other vehicle sensor of an other vehicle located proximate the vehicle, wherein the other vehicle sensor is a similar type to the sensor; and determine when information received from the sensor is within a predefined range of the information received from the other vehicle sensor.

In Example 35, the subject matter of Examples 29-34 includes, wherein the sensor testing processor, for the test of the sensor relative to a reference, is to: receiving sensor information from a landmark captured after the predefined event is detected; and determining when information received from the sensor is within a predefined range of information received from the landmark captured before the predefined event is detected.

In Example 36, the subject matter of Examples 29-35 includes, wherein the sensor is at least one of: a red-blue-green (RBG) camera, a light detection and ranging (LIDAR) sensor, an accelerometer, a gyroscope, a micro-electro-mechanical system (MEMs), a pressure sensor, 2D camera, a 3D camera, an infra-red (IR) camera, a depth camera, a microphone, a thermometer, a proximity sensor, a location sensor, ultrasonic sensor, radio detection and ranging (RADAR), radio receiver, capacitance sensor, or a global positioning system (GPS) sensor.

In Example 37, the subject matter of Examples 29-36 includes, wherein the sensor testing processor is operable for determination of the occurrence of the predefined event is to detect an acceleration value from a heavy-duty accelerometer, motion, or pressure sensor whose normal operating specifications are within a vehicle crash range of acceleration.

In Example 38, the subject matter of Examples 29-37 includes, wherein the sensor testing processor is further to: determine, according to a predefined critical sensor criteria, when the sensor is a critical sensor as a first critical sensor condition, and when the reference testing result is negative as a second critical sensor condition; and when the first and second critical sensor conditions are both true, direct the vehicle to be in a not-drivable state and to remain at its current location.

In Example 39, the subject matter of Examples 29-38 includes, wherein the sensor testing processor is further to: collect and store landmark data prior to the occurrence of the predefined event.

In Example 40, the subject matter of Examples 29-39 includes, wherein the sensor testing processor is further to: contact an assist vehicle to assist in driving to a service location; and utilize information from an assisting sensor of the assist vehicle when the vehicle has been directed to be serviced.

In Example 41, the subject matter of Examples 29-40 includes, wherein the sensor testing processor is further to: receive the operational specification values from an external source.

In Example 42, the subject matter of Example 41 includes, wherein the external source is a networked cloud-based sensor testing processor, edge node, or remote server.

Example 43 is a sensor testing apparatus of a vehicle comprising: a sensor testing processor; and a memory coupled to the sensor testing processor, the apparatus comprising: means for determining when event conditions are true that comprise: an occurrence of a predefined event is detected that impacts a sensor of the vehicle; and after the predefined event is detected, the sensor is outputting sensor values within sensor specification values; and means for, when the event conditions are true, testing the sensor relative to a reference to determine when the sensor is operating within reference criteria to produce a positive reference testing result; and means for, when the reference testing result is positive, directing the vehicle to return to normal operation, and otherwise directing the vehicle to be serviced.

In Example 44, the subject matter of Example 43 includes, wherein a further event condition is that the sensor has operated within sensor operational specification values during the predefined event.

In Example 45, the subject matter of Example 44 includes, means for, when the sensor has operated outside of the sensor operational specification, decommissioning the sensor.

In Example 46, the subject matter of Examples 43-45 includes, wherein the testing of the sensor relative to a reference comprises: means for receiving sensor information from a user device sensor of a device from a user, wherein the user device sensor is a similar type to the sensor; and means for determining when information received from the sensor is within a predefined range of the information received from the user device sensor.

In Example 47, the subject matter of Examples 43-46 includes, wherein the testing of the sensor relative to a reference comprises: means for receiving sensor information from a different location sensor in a different location on the vehicle, wherein the different location sensor is a similar type to the sensor; and means for determining when information received from the sensor is within a predefined range of the information received from the different location sensor.

In Example 48, the subject matter of Examples 43-47 includes, wherein the testing of the sensor relative to a reference comprises: means for receiving sensor information from an other vehicle sensor of an other vehicle located proximate the vehicle, wherein the other vehicle sensor is a similar type to the sensor; and means for determining when information received from the sensor is within a predefined range of the information received from the other vehicle sensor.

In Example 49, the subject matter of Examples 43-48 includes, wherein the testing of the sensor relative to a reference comprises: means for receiving sensor information from a landmark captured after the event is detected; and means for determining when information received from the sensor is within a predefined range of information received from the landmark captured before the event is detected.

In Example 50, the subject matter of Examples 43-49 includes, wherein the sensor is at least one of: a red-blue-green (RBG) camera, a light detection and ranging (LIDAR) sensor, an accelerometer, a gyroscope, a micro-electro-mechanical system (MEMs), a pressure sensor, 2D camera, a 3D camera, an infra-red (IR) camera, a depth camera, a microphone, a thermometer, a proximity sensor, a location sensor, ultrasonic sensor, radio detection and ranging (RADAR), radio receiver, capacitance sensor, or a global positioning system (GPS) sensor.

In Example 51, the subject matter of Examples 43-50 includes, wherein the determining of the occurrence of the predefined event comprises detecting an acceleration value from a heavy-duty accelerometer, motion, or pressure sensor whose normal operating specifications are within a vehicle crash range of acceleration.

In Example 52, the subject matter of Examples 43-51 includes, means for determining, according to a predefined critical sensor criteria, when the sensor is a critical sensor as a first critical sensor condition, and when the reference testing result is negative as a second critical sensor condition; and means for, when the first and second critical sensor conditions are both true, directing the vehicle to be in a not-drivable state and to remain at its current location.

In Example 53, the subject matter of Examples 43-52 includes, means for collecting and storing landmark data prior to the occurrence of the predefined event.

In Example 54, the subject matter of Examples 43-53 includes, means for contacting an assist vehicle to assist in driving to a service location; and means for utilizing information from an assisting sensor of the assist vehicle when the vehicle has been directed to be serviced.

In Example 55, the subject matter of Examples 43-54 includes, means for receiving the operational specification values from an external source.

In Example 56, the subject matter of Example 55 includes, wherein the external source is a networked cloud-based sensor testing processor, edge node, or remote server.

Example 57 is a computer program product comprising one or more computer readable storage media comprising computer-executable instructions operable to, when executed by processing circuitry of a device, cause the device to perform any of the methods of Examples 15-28.

Example 58 is a system comprising means to perform any of the methods of Examples 15-28.

Example 59 is a system to perform any of the operations of Examples 1-56.

Example 60 is a method to perform any of the operations of Examples 1-56.

Example 61 is at least one machine-readable medium including instructions that, when executed by processing circuitry, cause the processing circuitry to perform operations to implement of any of Examples 1-56.

What is claimed is:

1. A sensor testing apparatus of a vehicle, the apparatus comprising:
   a sensor testing system processor to:
   determine when event conditions are true that comprise:
   an occurrence of a predefined event is detected that impacts a sensor of the vehicle, wherein the impact is a physical impact that is detected by an accelerometer and is greater than a threshold force; and
   after the predefined event is detected, the sensor outputs sensor values within sensor specification values; and
   when the event conditions are true, test the sensor relative to a reference to determine when the sensor operates within reference criteria to produce a positive reference testing result, wherein the reference is obtained from a second sensor of a similar type to the sensor, the second sensor configured to capture, detect, or produce substantially the same data as the sensor under test for the reference;
   when the reference testing result is positive, direct the vehicle to return to normal operation, and otherwise direct the vehicle to be serviced.

2. The apparatus of claim 1, wherein a further event condition is that the sensor has operated within sensor operational specification values during the predefined event.

3. The apparatus of claim 2, further comprising:
   when the sensor has operated outside of the sensor operational specification, the sensor testing processor is to decommission the sensor.

4. The apparatus of claim 1, wherein the sensor testing processor, for the test of the sensor relative to a reference, is to:
   receive sensor information from a user device sensor of a device from a user, wherein the user device sensor is a similar type to the sensor; and
   determine when information received from the sensor is within a predefined range of the information received from the user device sensor.

5. The apparatus of claim 1, wherein the sensor testing processor, for the test of the sensor relative to a reference, is to:
   receive sensor information from a different location sensor in a different location on the vehicle, wherein the different location sensor is a similar type to the sensor; and
   determine when information received from the sensor is within a predefined range of the information received from the different location sensor.

6. The apparatus of claim 1, wherein the sensor testing processor, for the test of the sensor relative to a reference, is to:
   receive sensor information from an other vehicle sensor of an other vehicle located proximate the vehicle, wherein the other vehicle sensor is a similar type to the sensor; and
   determine when information received from the sensor is within a predefined range of the information received from the other vehicle sensor.

7. The apparatus of claim 1, wherein the sensor testing processor, for the test of the sensor relative to a reference, is to:
   receive sensor information from a landmark captured after the predefined event is detected; and
   determine when information received from the sensor is within a predefined range of information received from the landmark captured before the predefined event is detected.

8. The apparatus of claim 1, wherein the sensor is at least one of: a red-blue-green (RBG) camera, a light detection and ranging (LIDAR) sensor, an accelerometer, a gyroscope, a micro-electro-mechanical system (MEMs), a pressure sensor, 2D camera, a 3D camera, an infra-red (IR) camera, a depth camera, a microphone, a thermometer, a proximity sensor, a location sensor, ultrasonic sensor, radio detection and ranging (RADAR), radio receiver, capacitance sensor, or a global positioning system (GPS) sensor.

9. The apparatus of claim 1, wherein the sensor testing processor is operable for determination of the occurrence of the predefined event is to detect an acceleration value from a heavy-duty accelerometer, motion, or pressure sensor whose normal operating specifications are within a vehicle crash range of acceleration.

10. The apparatus of claim 1, wherein the sensor testing processor is further to:
    determine, according to a predefined critical sensor criteria, when the sensor is a critical sensor as a first critical sensor condition, and when the reference testing result is negative as a second critical sensor condition; and
    when the first and second critical sensor conditions are both true, direct the vehicle to be in a not-drivable state and to remain at its current location.

11. The apparatus of claim 1, wherein the sensor testing processor is further to: collect and store landmark data prior to the occurrence of the predefined event.

12. The apparatus of claim 1, wherein the sensor testing processor is further to:
    contact an assist vehicle to assist in driving to a service location; and
    utilize information from an assisting sensor of the assist vehicle when the vehicle has been directed to be serviced.

13. The apparatus of claim 1, wherein the sensor testing processor is further to:
    receive the operational specification values from an external source.

14. The apparatus of claim 13, wherein the external source is a networked cloud-based sensor testing processor, edge node, or remote server.

15. A method performed by a sensor testing apparatus of a vehicle comprising:
    a sensor testing processor; and
    a memory coupled to the sensor testing processor, the method comprising:
    determining when event conditions are true that comprise:
    an occurrence of a predefined event is detected that impacts a sensor of the vehicle, wherein the impact is a physical impact that is detected by an accelerometer and is greater than a threshold force; and
    after the predefined event is detected, the sensor is outputting sensor values within sensor specification values; and when the event conditions are true, testing the sensor relative to a reference to determine when the sensor is operating within reference criteria to produce a positive reference testing result, wherein the reference is obtained from a second sensor of a similar type to the sensor, the second sensor configured to capture, detect, or produce substantially the same data as the sensor under test for the reference;

when the reference testing result is positive, directing the vehicle to return to normal operation, and otherwise directing the vehicle to be serviced.

16. The method of claim 15, wherein a further event condition is that the sensor has operated within sensor operational specification values during the predefined event.

17. The method of claim 16, further comprising:
when the sensor has operated outside of the sensor operational specification, decommissioning the sensor.

18. The method of claim 15, wherein the testing of the sensor relative to a reference comprises:
receiving sensor information from a user device sensor of a device from a user, wherein the user device sensor is a similar type to the sensor; and
determining when information received from the sensor is within a predefined range of the information received from the user device sensor.

19. The method of claim 15, wherein the testing of the sensor relative to a reference comprises:
receiving sensor information from a different location sensor in a different location on the vehicle, wherein the different location sensor is a similar type to the sensor; and
determining when information received from the sensor is within a predefined range of the information received from the different location sensor.

20. The method of claim 15, wherein the testing of the sensor relative to a reference comprises:
receiving sensor information from an other vehicle sensor of an other vehicle located proximate the vehicle, wherein the other vehicle sensor is a similar type to the sensor; and
determining when information received from the sensor is within a predefined range of the information received from the other vehicle sensor.

21. The method of claim 15, wherein the testing of the sensor relative to a reference comprises:
receiving sensor information from a landmark captured after the predefined event is detected; and
determining when information received from the sensor is within a predefined range of information received from the landmark captured before the predefined event is detected.

22. The method of claim 15, wherein the sensor is at least one of: a red-blue-green (RBG) camera, a light detection and ranging (LIDAR) sensor, an accelerometer, a gyroscope, a micro-electro-mechanical system (MEMs), a pressure sensor, 2D camera, a 3D camera, an infra-red (IR) camera, a depth camera, a microphone, a thermometer, a proximity sensor, a location sensor, ultrasonic sensor, radio detection and ranging (RADAR), radio receiver, capacitance sensor, or a global positioning system (GPS) sensor.

23. The method of claim 15, wherein the determining of the occurrence of the predefined event comprises detecting an acceleration value from a heavy-duty accelerometer, motion, or pressure sensor whose normal operating specifications are within a vehicle crash range of acceleration.

24. At least one non-transitory machine-readable medium including instructions, which when executed by a sensor testing processor of a sensor testing apparatus, cause the sensor testing processor to:
determine when event conditions are true that comprise:
an occurrence of a predefined event is detected that impacts a sensor of the vehicle, wherein the impact is a physical impact that is detected by an accelerometer and is greater than a threshold force; and
after the predefined event is detected, the sensor outputs sensor values within sensor specification values; and
when the event conditions are true, test the sensor relative to a reference to determine when the sensor operates within reference criteria to produce a positive reference testing result, wherein the reference is obtained from a second sensor of a similar type to the sensor, the second sensor configured to capture, detect, or produce substantially the same data as the sensor under test for the reference;
when the reference testing result is positive, direct the vehicle to return to normal operation, and otherwise direct the vehicle to be serviced.

25. The medium of claim 24, wherein a further event condition is that the sensor has operated within sensor operational specification values during the predefined event.

* * * * *